UNITED STATES PATENT OFFICE.

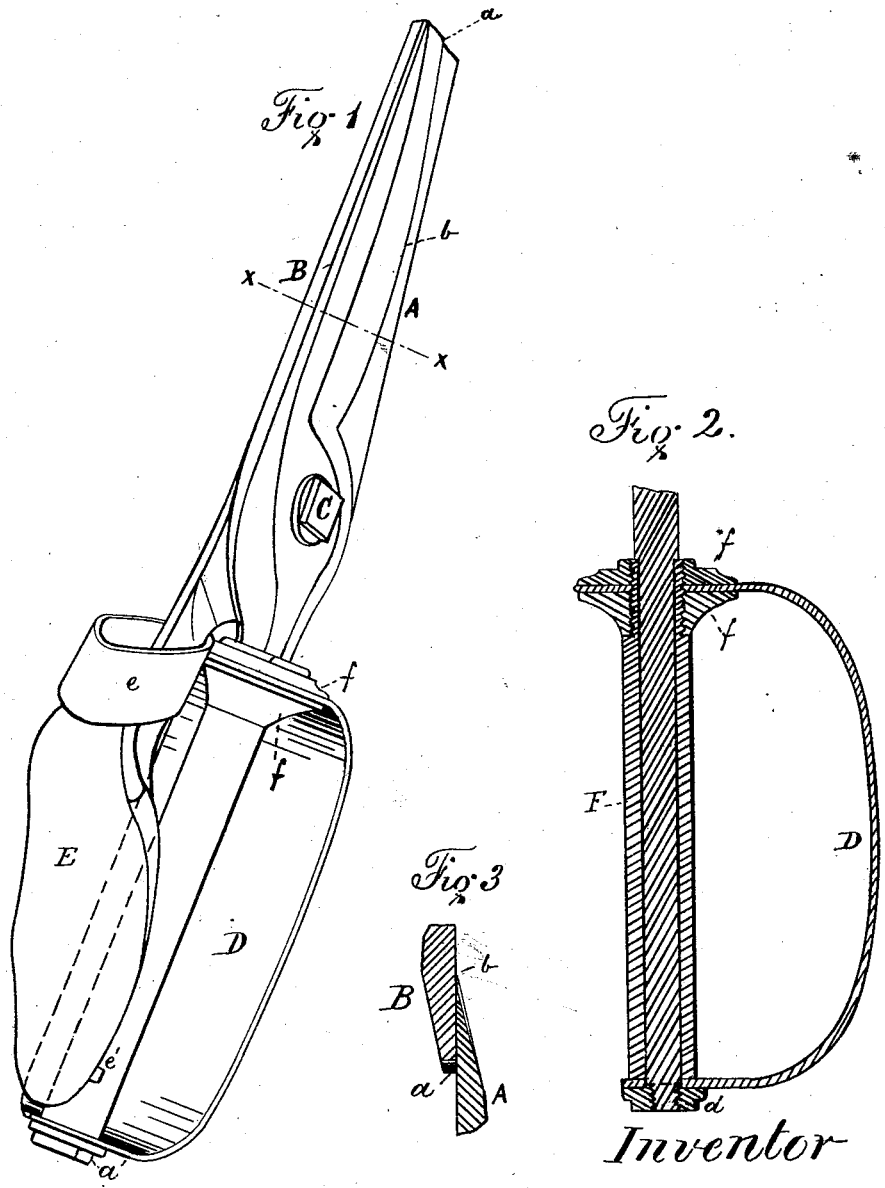

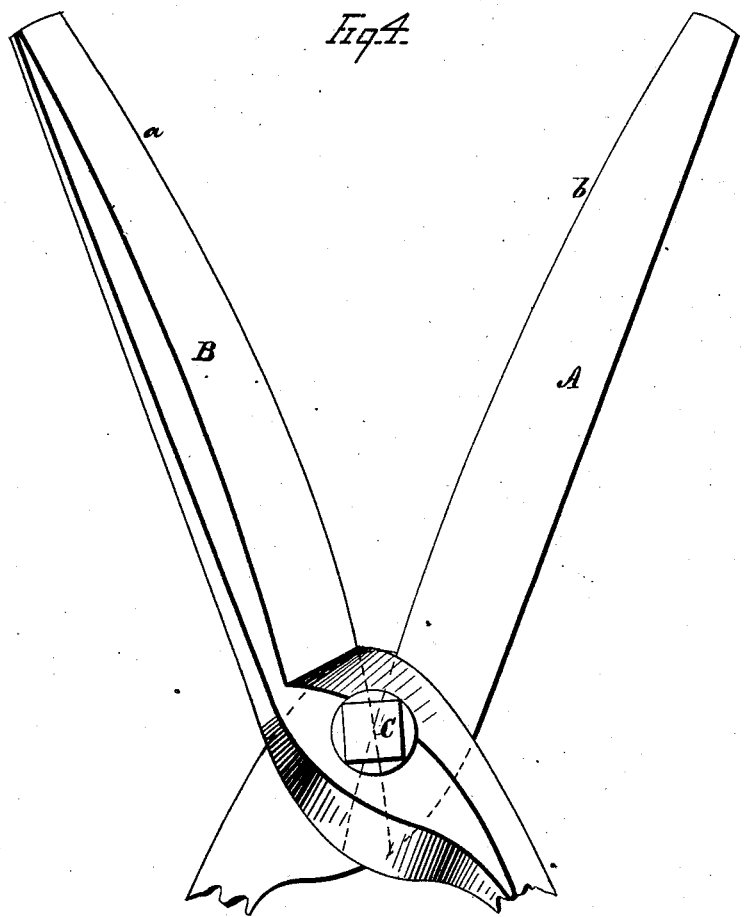

WILLIS H. JOHNSON, OF SPRINGFIELD, ILLINOIS.

IMPROVEMENT IN PRUNING-SHEARS.

Specification forming part of Letters Patent No. 160,102, dated February 23, 1875; application filed July 15, 1874.

CASE A.

*To all whom it may concern:*

Be it known that I, WILLIS H. JOHNSON, of Springfield, in the county of Sangamon and State of Illinois, have invented a new and useful Improvement in Pruning-Shears; and I do hereby declare that the following is a full and exact description of the same, reference being had to the accompanying drawings, and to the letters of reference marked thereon.

The object I have in view is a useful improvement in pruning-shears, whereby the same may be more conveniently and effectively used; and my invention therein consists in the combination, in a pair of pruning-shears, of a handle fitted to conform to the hand, and a revolving hilt or handle, which will adapt itself to the motion of the blades, as is more fully hereinafter explained.

My invention further consists in constructing pruning-shears having two blades, (one a thin cutting-blade, and the other a thick non-cutting blade,) with the edges of both blades convexed upon a circle which, if continued, would pass through or slightly behind the center of the fulcrum or pivot, as hereinafter more fully set forth and shown.

To enable others skilled in the art to make and use my invention, I proceed to describe the same in connection with the drawings, in which—

Figure 1 represents a perspective view of my shears, the line of the curve of the blades passing behind the pivot or fulcrum. Fig. 2 represents a sectional view of the revolving handle; and Fig. 3 represents a sectional view of the blades on the line *x x*, Fig. 1. Fig. 4, Sheet 2, is a sectional view or diagram of the shears, the same being open, showing, by dotted lines, the continuance of the curve of the blades, through the pivot or fulcrum.

In the drawings, A B represent two blades of a pair of pruning-shears, pivoted together, at about their middle points, by the pin C. The blade A allows the pin C to pass freely through it. The blade B, however, has a thread cut where the pin C passes, and into which a thread on the pin C screws. A nut screws over the head of this pin, and secures the blades together. It will be seen, therefore, that the pin C and the blade B are rigidly connected, while the blade A is loose. By means of the pin C the blades can be screwed together to any desired degree of compression, and, as one of the blades is secured to the pin, there is never danger of their becoming loose. The cutting portion *a* and *b* of the blades A and B is a convex curve, which is the best form for pruning-shears, the curve causing the blades to slip a little, so as to make a drawing-cut. The edge *a* of the loose blade A is sharp. The edge *b* of the blade B is only very slightly beveled. The handle E of the blade A is flattened out, and shaped to conform to the thumb and a part of the palm of the hand. A small strap, *e*, is placed on the upper part of the handle, and is used to go over the end of the thumb and confine it closely to the handle E. A small stud, *e'*, projects from the end of the handle E, and prevents the handle of blade B from closing altogether with the handle of blade A, thus protecting the fingers of the operator. The handle of the blade B is a simple prolongation of the blade, reduced in size, and circular in cross-section from the joint at the pin C to the end. A cylinder, F, fits loosely over the handle of blade A, and is kept from falling off by means of a nut, *a'*, which screws on a thread on the end of said handle. The cylinder F is provided with a leather guard, D, secured to it by means of clamps *f* on one end of the cylinder, while the nut *a'* performs the same office on the other end.

It will be seen the arrangement of the handles of these shears gives a very powerful leverage, and enables the operator to apply the greatest power possible, while the conformation of the cutting-edges of the blades enables that power to be applied to the best advantage.

The object and advantage of shaping or convexing the cutting-edges of the blades, as above set forth, so that the line of the curve of the blades, if continued, would pass through or behind the pivot or fulcrum, are to cause the shears to hold or gripe and draw the article to be cut as nearly to the fulcrum as possible.

Having thus described my invention, and explained some of its advantages, what I claim as new, and desire to secure by Letters Patent, is—

1. The combination of the handle E of a blade, A, fitted to conform to the hand, and provided with a strap, e, and stud e', as described, with the handle of a blade, B, provided with a loose revolving hilt or cylinder, F, and guard D, said handles being joined, as described, and the several parts operating substantially as set forth.

2. Pruning-shears having two blades, (one a thin cutting-blade, and the other a thick non-cutting blade,) with the edges of both blades convexed upon a circle, which, if continued, would pass through or slightly behind the center of the fulcrum or pivot, substantially as shown and described.

This specification signed and witnessed this 16th day of June, 1874.

WILLIS H. JOHNSON.

Witnesses:
SAML. D. SCHOLES,
T. C. MATHER.